(12) United States Patent
Chang et al.

(10) Patent No.: US 7,546,750 B2
(45) Date of Patent: *Jun. 16, 2009

(54) METHOD FOR FABRICATING OPTICAL FIBER USING DEUTERIUM EXPOSURE

(75) Inventors: Kai H. Chang, Suwanee, GA (US); David Kalish, Roswell, GA (US); Thomas John Miller, Alpharetta, GA (US)

(73) Assignee: Fitel USA Corp., Norcross, GA (US)

( * ) Notice: Subject to any disclaimer, the term of this patent is extended or adjusted under 35 U.S.C. 154(b) by 782 days.

This patent is subject to a terminal disclaimer.

(21) Appl. No.: 10/620,068

(22) Filed: Jul. 15, 2003

(65) Prior Publication Data

US 2004/0011081 A1 Jan. 22, 2004

Related U.S. Application Data

(62) Division of application No. 09/891,903, filed on Jun. 26, 2001, now Pat. No. 6,776,012.

(51) Int. Cl.
*C03B 37/018* (2006.01)

(52) U.S. Cl. .............................. 65/378; 65/413; 65/424; 65/426

(58) Field of Classification Search .................. 65/413, 65/424, 426, 378
See application file for complete search history.

(56) References Cited

U.S. PATENT DOCUMENTS

| | | | |
|---|---|---|---|
| 3,791,714 A | 2/1974 | Maurer | |
| 3,933,454 A | 1/1976 | DeLuca | |
| 4,389,230 A | 6/1983 | Modone et al. | |
| 4,445,918 A | 5/1984 | Modone et al. | |
| 4,515,612 A | 5/1985 | Burrus et al. | |
| 4,583,997 A | 4/1986 | Staudigl | |
| 4,685,945 A | 8/1987 | Freund | |
| 4,820,322 A | 4/1989 | Baumgart et al. | |
| 5,180,411 A * | 1/1993 | Backer et al. | ................. 65/422 |
| 5,262,365 A * | 11/1993 | Oyobe et al. | ................. 501/54 |
| 5,478,371 A * | 12/1995 | Lemaire et al. | ............... 65/384 |

(Continued)

FOREIGN PATENT DOCUMENTS

JP 60090852 5/1985

OTHER PUBLICATIONS

"Room Temperature" from www.everything2.com/index.pl?node=room%20temperature Sep. 2, 2005.*

*Primary Examiner*—John Hoffmann

(57) ABSTRACT

Embodiments of the invention include a method for making optical fiber having reduced aging or hydrogen aging loss over the life of the fiber and optical fiber systems including such optical fibers. Improved silicon-oxygen stoichiometry during one or more preform manufacturing steps reduces the amount of Si defects generated in the optical fiber preform. Also, deuterium exposure of optical fiber drawn from the preform reduces the likelihood of having atomic defects such as Si defects in the optical fiber that, over time, attract and bond with hydrogen atoms to form molecules that contribute to increased water absorption loss. The inventive method produces optical fibers with improved transmission characteristics, e.g., optical fibers made by methods according to embodiments of the invention have transmission loss at 1385 nanometers that is less than 0.33 dB/km and the aging loss increase thereafter is less than 0.04 dB/km.

9 Claims, 3 Drawing Sheets

U.S. PATENT DOCUMENTS

| | | |
|---|---|---|
| 5,500,031 A | 3/1996 | Atkins et al. |
| 5,930,420 A | 7/1999 | Atkins et al. |
| 6,131,415 A | 10/2000 | Chang et al. |
| 6,496,627 B1 * | 12/2002 | Tuminaro .................. 385/102 |
| 6,499,318 B1 | 12/2002 | Lemaire et al. |
| 6,776,012 B2 * | 8/2004 | Chang et al. .................. 65/412 |
| 2002/0073741 A1 | 6/2002 | Ishida |
| 2002/0090183 A1 | 7/2002 | Tuminaro |

\* cited by examiner

METHOD FOR FABRICATING OPTICAL FIBER USING DEUTERIUM EXPOSURE

BACKGROUND OF THE INVENTION

This application is a divisional of application Ser. No. 09/891,903, filed Jun. 26, 2001 now U.S. Pat No. 6,776,012.

FIELD OF THE INVENTION

The invention relates to optical fiber. More particularly, the invention relates to fabricating optical fibers having improved transmission characteristics over the wavelength region 700-1600 nanometers.

DESCRIPTION OF THE RELATED ART

Optical fibers typically are fabricated by heating and drawing a portion of an optical preform usually comprising a solid glass rod with a refractive glass core surrounded by a protective glass cladding having a lower refractive index than that of the core. The glass fiber is coated with one or more layers of protective coating materials cured, e.g., by radiation.

Conventionally, several processes exist for fabricating optical preforms, including modified chemical vapor deposition (MCVD), vapor axial deposition (VAD) and outside vapor deposition (OVD). In conventional VAD and OVD processes, layers of glass particles or "soot" are deposited on the end surface or the outside surface, respectively, of a starter rod. The deposited soot layers then are dried or dehydrated, e.g., in a chlorine or fluorine-containing atmosphere, and sintered or consolidated to form a solid preform core rod.

Once the preform core rod is formed, optical fiber is drawn directly therefrom or, alternatively, one or more overclad layers are formed thereon prior to drawing optical fiber therefrom. The overclad layers are formed on the preform core rod, e.g., by a soot deposition technique similar to that used in forming the preform core rod. Alternatively, the overclad layers are formed by collapsing a silica-based tube or sleeve around the preform core rod. Such process typically is referred to as the Rod-In-Tube (RIT) process. See, e.g., U.S. Pat. No. 4,820,322, which is co-owned with this application, and hereby is incorporated by reference herein.

The transmission characteristics of optical fiber vary based on a number of factors, including, e.g., scattering such as Rayleigh scattering, fiber bending and absorption such as hydroxyl-ion (OH) absorption. OH absorption, or "water" absorption, is of particular interest because it reduces useful bandwidth in an otherwise relatively low transmission loss wavelength region from 700-1600 nanometers (nm), i.e., the wavelength region in which many current optical systems operate.

OH absorption, which is due to vibrational overtones of hydroxyl-ions in the fiber, typically causes three loss peaks within the 700-1600 nm region: 950 nm, 1240 nm, and 1385 nm. It has been desirable to reduce these water loss peaks, particularly the water loss peak centered around 1385 nm, since concentrations of OH as low as 1 part per million (ppm) can cause losses as great as 65 dB/km at 1385 nm in single mode fibers. Furthermore, reduction of the water loss peak at 1385 nm effectively provides an uninterrupted region of relatively low transmission loss from 1200-1600 nm. The wavelength region from 1200-1600 nm is of special interest because of the abundant availability of light sources such as Indium Phosphide (InP) -based sources. See, e.g., U.S. Pat. No. 6,131,415, which is co-owned with this application and assigned to the assignee of this application.

Conventional techniques for reducing the adverse affects of water loss include exchanging a portion of the hydrogen atoms with deuterium atoms in a high temperature (e.g., approximately 1000° Celsius) OD to OH exchange reaction. See, e.g., U.S. Pat. No. 4,445,918; U.S. Pat. No. 4,583,997; and U.S. Pat. No. 4,389,230, in which deuterium is provided during various stages of the manufacture of optical fiber preforms. Also, see U.S. Pat. No. 4,685,945, in which optical fiber preforms are exposed to deuterium in combination with high intensity light to reduce OH defects.

It should be noted that deuterium also has been used to effect refractive index changes in glass bodies, including optical fibers. See, e.g., U.S. Pat. Nos. 5,930,420; 5,500,031; and 4,515,612, all of which are co-owned with this application and assigned to the assignee of this application.

Another type of absorption loss that is sought to be reduced or eliminated is aging loss including the hydrogen aging loss that occurs during the lifetime of the fiber. Such losses are thought to occur because of the chemical reaction between various defects in the optical fiber and hydrogen in the optical fiber environment, e.g., within an optical fiber cable environment. Such defects include, e.g., germanium (Ge) defects and silicon (Si) defects introduced into the optical fiber during its fabrication. The chemical reactions are made possible, e.g., by the ability of hydrogen to diffuse readily into the optical fiber.

It would be desirable to have available a method for making optical fibers, including single mode optical fibers, that further reduces aging or hydrogen aging loss over the life of the fiber and optical fiber systems including such optical fibers.

SUMMARY OF THE INVENTION

The invention is embodied in a method for making optical fiber having reduced aging or hydrogen aging loss over the life of the fiber and optical fiber systems including such optical fibers. Embodiments of the invention provide improved silicon-oxygen stoichiometry in fiber manufacturing environments to reduce the amount of Si defects in an optical fiber preform, combined with subsequent deuterium exposure of the fiber drawn from the preform to reduce the likelihood of having atomic defects in the optical fiber that, over time, attract and bond with hydrogen atoms to form molecules that contribute to increased water absorption loss. Such improved silicon-oxygen stoichiometry has neither excessive oxygen atoms, which reduces the number of oxygen-rich defects (Si—O—O—Si defects) that are formed and subsequently trapped in the silica glass, nor is a deficiency in oxygen atoms, which reduces the number of oxygen-deficient defects (Si—Si defects) formed. Also, during the subsequent deuterium exposure, deuterium atoms react with Si defects such as Si—O.defects and Si.defects to form SiOD or SiD, respectively, thus reducing the amount of Si defects in the fiber and consequently the possible amount of reactions between Si defects and hydrogen, which reactions typically cause SiOH and SiH losses in the fiber.

Methods for making optical fibers according to embodiments of the invention include the steps of manufacturing an optical fiber preform, drawing fiber from the preform, and exposing the drawn fiber to deuterium, e.g., by exposing the drawn fiber to a deuterium atmosphere having, e.g., a partial pressure of approximately 0.01 atmospheres of deuterium at room temperature for approximately 6 days, or, alternatively, a partial pressure of approximately 0.05 atmospheres of deuterium at room temperature for approximately 1.5 days. The fiber manufacturing steps include forming a glass core rod, dehydrating the glass core rod, consolidating the glass core rod, and forming an overclad region around the glass core rod. According to embodiments of the invention, dehydration occurs in an atmosphere containing oxygen or oxygen and one or more chlorine-containing gases, fluorine-containing gases and/or carbon monoxide (CO), with the partial pressure of the gases established and/or adjusted to provide an environment that is neither oxygen-rich or oxygen-deficient. Alternatively, the overclad region formation step occurs in a similar atmosphere, with the partial pressure of the gases established for improved silicon-oxygen stoichiometry.

Optical fiber made by methods according to embodiments of the invention have improved transmission characteristics. For example, the inventive optical fibers have transmission loss at 1385 nanometers that is less than 0.33 dB/km and the loss increase thereafter is less than 0.04 dB/km.

DETAILED DESCRIPTION OF THE PREFERRED EMBODIMENT

Figure 1:
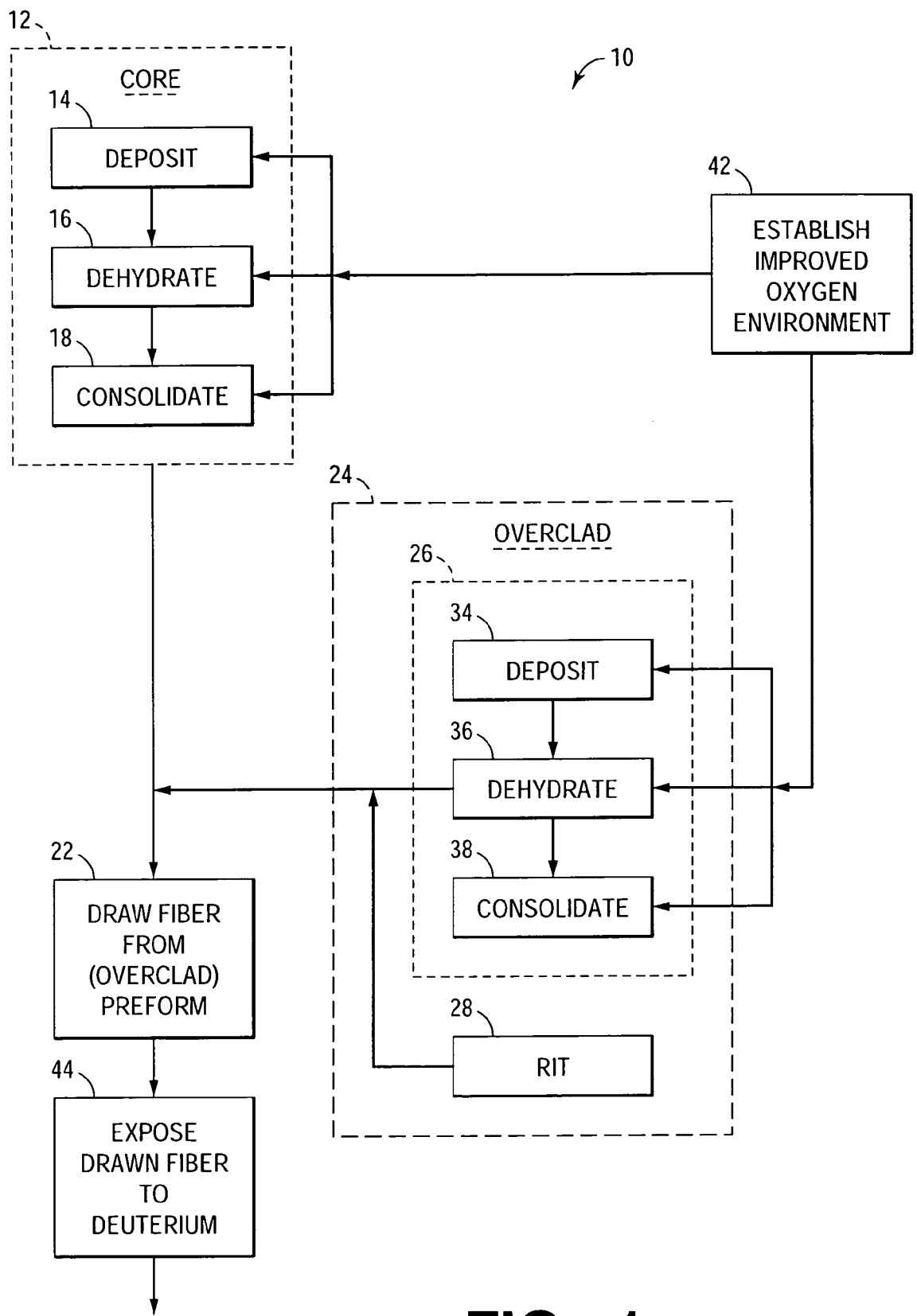
FIG. 1 is a simplified block diagram of a method for making optical fibers according to embodiments of the invention.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring to FIG. 1, shown is a simplified block diagram of a method 10 for making optical fibers, including single mode optical fibers, according to embodiments of the invention. The method 10 includes a step 12 of forming the core rod portion of a preform from which to draw optical fiber. One typical manner in which to make the core rod includes the soot deposition step 14, the dehydration step 16 and the consolidation step 18.

The soot deposition step 14 includes depositing layers of glass particles (or "soot") on a starter rod such as a silica starter rod to form a glass core rod. In vapor axial deposition (VAD) processes, the soot is deposited on the end surface of the starting rod and accumulates radially; in outside vapor deposition (OVD) processes, the soot is deposited on the outer surface of the starting rod and accumulates axially. The soot particles involve, e.g., vaporized compounds such as germanium, phosphorus and fluorine for index of refraction doping, and silicon tetrachloride ($SiCl_4$), which reacts with oxygen to form the glass-making component silica ($SiO_2$).

The dehydration step 16 includes drying or dehydrating the deposited soot. Typically, the deposited soot body is removed from the starter rod and traversed through an environment containing drying gases at a temperature of approximately 1200° Celsius (C.). Such gases include, e.g., oxygen, fluorine, fluorine-containing gases, chlorine, chlorine-containing gases. For purposes of discussion herein, fluorine-containing gases are gases that contain fluorine and are known to be used for doping and/or dehydration. Similarly, for purposes of discussion herein, chlorine-containing gases are gases that contain chlorine and are known to be used for doping and/or dehydration. Because the core rod at this stage is a porous, sooty body, fluorine or chlorine gas permeates the core rod and removes OH ions therefrom. The rate at which the OH ions are removed depends on, e.g., the dehydration temperature, the speed of the body through the dehydrating environment and the gas flow rate of the fluorine or chlorine. OH ions that are not removed from the optical fiber contribute to OH absorption or "water" absorption, which, as discussed previously herein, contributes to optical fiber transmission loss.

The consolidation step 18 sinters or consolidates the dehydrated core rod into a homogenous state. For example, the consolidation step 18 includes traversing the dehydrated core rod through an oxygen and helium environment at a temperature of approximately 1500° C. During this step, the deposited soot particles sinter into a solid, relatively dense glass core rod. Specific details regarding conventional dehydration and consolidation steps are found, e.g., in U.S. Pat. No. 3,933,454, issued Jan. 20, 1976.

Once the core rod is formed, the next step 22 is to draw optical fiber. Although it is possible to draw optical fiber from the glass core rod as formed by the forming step 12, the glass core rod typically is overclad by an overclad step 24 to form an overclad preform before optical fiber is drawn therefrom. Forming an overclad region around a core rod makes for a larger preform, which yields more drawn fiber per preform than smaller, non-overclad preforms.

The overclad step 24 forms one or more overclad regions around the core rod, e.g., by an overclad soot deposition technique 26 or, alternatively, by a Rod-In-Tube (RIT) technique 28. The formation of the overclad region around the core rod results in an overclad core rod, i.e., an overclad optical fiber preform. The overclad soot deposition technique 26 is similar to the soot deposition steps 14, 16, 18 discussed previously herein with respect to the step 12 of making the glass core rod. The overclad soot deposition technique 26 includes a step 34 of depositing glass-making soot particles onto the previously-formed glass core rod, a step 36 of dehydrating the deposited soot particles, and a step 38 of consolidating the deposited particles into an overclad region around the core rod.

The RIT technique 28 typically involves the collapse of a tube or sleeve, e.g., a silica-based tube or sleeve, around the preform core rod. More specifically, an overclad tube is positioned around the glass core rod and heated along the length thereof to cause it to collapse onto the glass core rod, thus forming the overclad optical fiber preform. For example, see U.S. Pat. No. 4,820,322, which is co-owned with this application.

The glass-making soot particles are deposited using a process such as VAD or OVD. The deposited soot particles typically involve glass-making compounds such as silicon tetrachloride ($SiCl_4$) but, unlike the soot particles used to make the core rod, usually do not contain additional doping materials such as germanium, phosphorus and fluorine. Once the overclad soot particles are deposited on the core rod, the overclad soot particles are dehydrated, e.g., in an environment containing drying gases such as oxygen, fluorine, fluorine-containing gases, chlorine or chlorine-containing gases, at a temperature of approximately 1200° Celsius (C.). Dehydration is performed, e.g., to remove OH ions from the overclad soot body. As discussed hereinabove, the presence of OH ions in the various regions of the optical fiber preform are problematic.

Consolidation occurs, e.g., in an oxygen and helium environment at a temperature of approximately 1500° C. Consolidation solidifies the deposited soot layers into an overclad region surrounding the core rod.

Once the optical fiber preform is formed, the step 22 of drawing optical fiber from the preform is performed. The fiber drawing step 22 includes drawing an optical fiber from a heated end of the preform. For example, the preform is suspended vertically and moved into and through a furnace at a controlled rate. The preform softens as it is heated (e.g., to approximately 2000° C.) and a glass fiber is drawn from a molten end of the preform by a capstan of other suitable device outside of and below the furnace.

Figure 2A:
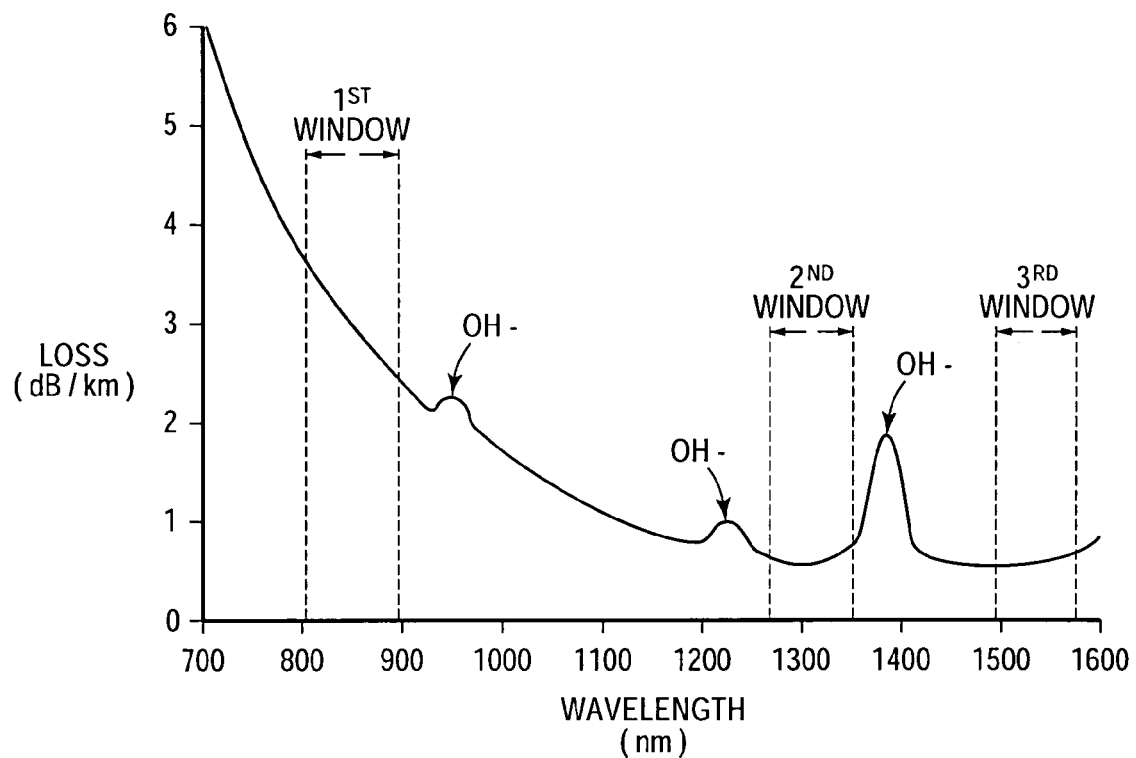
FIG. 2a is a graphical diagram of the transmission loss of a typical optical fiber at wavelengths ranging from 700-1600 nanometers (nm)
Figure 2B:
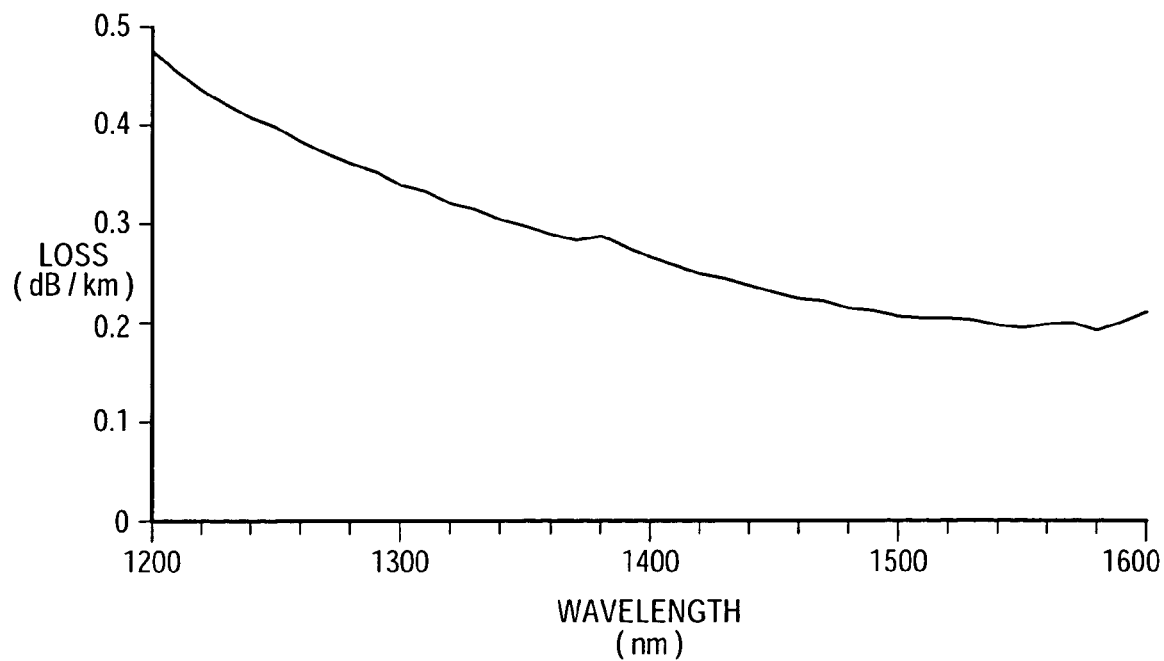
FIG. 2b is a graphical diagram of the transmission loss of an optical fiber within the 700-1600 nm wavelength range according to the methods disclosed in U.S. Pat. No. 6,131,415.

As discussed previously herein, the transmission characteristics of optical fiber are affected by a number of factors, including hydroxyl-ion (OH) absorption (i.e., "water" absorption). Within the 700-1600 nanometer (nm) region, water absorption causes loss peaks at approximately 950 nm, 1240 nm and 1385 nm. Such loss peaks are shown clearly, e.g., in FIG. 2a, which is a graphical diagram of the transmission loss of a typical optical fiber at wavelengths ranging from 700-1600 nm. Also, many efforts have been made to reduce the water absorption peaks. See, for example, U.S. Pat. No. 6,131,415 (Chang et al.), which is co-owned with this application and assigned to the assignee of this application. Referring now to FIG. 2b, shown is a graphical diagram of the transmission loss of an optical fiber within the 700-1600 nm wavelength range according to the methods disclosed in U.S. Pat. No. 6,131,415.

However, another type of absorption loss is (hydrogen) aging loss. Conventional optical fibers typically experience increased transmission losses as the optical fiber ages. Such is caused, e.g., by the chemical reaction between hydrogen and various defects in the optical fiber during the lifetime of optical fiber. For example, chemical reactions between germanium (Ge) defects in the optical fiber and trace amounts of hydrogen present in the environment surrounding the optical fiber contribute to GeOH losses over the life of the optical fiber.

Moreover, silicon (Si) defects introduced into the optical fiber during the manufacture of the fiber typically cause SiOH and SiH losses in the fiber, which similarly result from the reaction over time between the Si defects and hydrogen present in the fiber (or cable) environment. Unfortunately, SiOH and SiH losses often are larger and occur sooner over the life of the fiber than, e.g., the GeOH losses. For example, SiOH aging losses often are up to and even greater than approximately 0.21 dB/km at 1385 nm.

In accordance with embodiments of the invention, the Si defects believed to be responsible for many of the SiOH losses are oxygen-rich defects (Si—O—O—Si defects). The Si—O—O—Si defects are believed to be caused by excess oxygen atoms in the silica glass, e.g., manufacturing an optical fiber preform in an environment having too much oxygen. Once these Si—O—O—Si defects are present in the silica glass, subsequent thermal operations (e.g., fiber draw) cause a number of the Si—O—O—Si defects to turn into broken Si—O bond defects (Si—O.defects), which become trapped in the fiber. The Si—O.defects, over time, attract hydrogen atoms to form SiOH molecules, which, as discussed hereinabove, cause water absorption losses.

In accordance with embodiments of the invention, the Si defects believed to contribute to SiH losses are oxygen-deficient defects (Si—Si defects). The Si—Si defects are believed to result from manufacturing optical fiber preforms (silica glass) in oxygen-deficient conditions. Subsequent thermal operations cause broken Si bond defects (Si.defects) to be formed from some of the Si—Si bond defects. The Si.defects become trapped in the fiber and, as the fiber ages, the Si.defects react with hydrogen atoms to form SiH molecules, which cause an absorption loss peak at 1530 nm.

According to embodiments of the invention, aging losses and other losses are reduced by providing improved oxygen stoichiometry conditions in fiber manufacturing environments to reduce the likelihood of generating oxygen-rich or oxygen-deficient Si defects in optical fiber preforms and optical fibers drawn therefrom that, over time, attract and bond with hydrogen atoms to form molecules that contribute to increased water absorption loss or other losses. More particularly, an environment is established that does not have excessive oxygen atoms, which environment reduces the number of Si—O—O—Si defects that are formed and subsequently trapped in the silica glass. Also, an environment is established that is not oxygen-deficient, which environment reduces the number of Si—Si defects formed.

The improved oxygen environments are established, e.g., through adjustment of the oxygen stoichiometry, at one or more steps during the optical fiber manufacturing process. For example, by adjusting oxidation-reduction conditions, the oxygen stoichiometry of the environment in which the core rod formation dehydration step 16 is formed is established in such a way that the environment does not have excessive oxygen atoms, nor is the environment oxygen-deficient. Alternatively, the oxygen stoichiometry of the environment in which the overclad dehydration step 36 is formed is established in this manner. Also, according to alternative embodiments of the invention, the oxygen stoichiometry of the environment in which the core rod formation deposition step 14 and/or the overclad deposition step 34 is performed is established in such a way that the silica material does not have excess oxygen atoms or is not oxygen-deficient. Also, according to other alternative embodiments of the invention, the oxygen stoichiometry of the environment in which the core rod formation consolidation step 18 and/or the overclad consolidation step 38 is performed is established in such a way that its particular environment does not cause the silica material to have excess oxygen atoms or cause the silica material to become oxygen-deficient.

The oxygen stoichiometry of one or more of these environments is adjusted, e.g., based on the particular specifics of the process step. For example, the oxygen partial pressure or other condition is established in one or more of the aforementioned environments by adjustment of the oxygen flow rate into the selected environment(s) to improve the oxidation conditions. Alternatively, e.g., the introduction of gases such as carbon monoxide (CO) improves the reduction conditions in the selected environment(s). Also, e.g., the effects of previously established oxygen stoichiometries provide the basis for establishing the oxygen stoichiometry of one or more of these environments.

The oxygen environment typically is a function of many factors, e.g., temperature, flow rates, duration, soot density profile, and reaction vessel dimensions and design. Hydrogen tests on drawn fiber often determine the number of defects and the type of defects (i.e., oxygen-rich or oxygen-deficient) caused by a certain environment on the preform from which the fiber was drawn.

Referring again to FIG. 1, embodiments of the invention include the step 42 of establishing the oxygen stoichiometry of the desired environment. The oxygen stoichiometry is established for the environment in which one or more of the core rod formation steps 14, 16, 18 occurs, and/or the environment in which one or more of the overclad region formation steps 34, 36, 38 occurs. For example, in the step 12 of manufacturing the core rod, an improved oxygen stoichiometry is established for the environment in which the dehydration step 16 occurs. That is, the oxygen stoichiometry is established, e.g., through flow rate adjustment or other condition, in such a manner that neither too many nor too few oxygen atoms are incorporated into the silica material. Accordingly, the likelihood of generating Si defects in the optical fiber preforms is reduced, which, in turn, reduces the likelihood of subsequent hydrogen aging losses in optical fiber drawn from the preform. Typically, an improved oxygen stoichiometry is established for the environment in which the core rod formation dehydration step 16 occurs. However, it is understood that embodiments of the invention include improving the oxygen stoichiometry of the environment in which any one or more of the core rod formation process steps 14, 16, 18 occur.

Also, as shown, the establishing step 42 includes improving the oxygen stoichiometry of one or more of the environments in which the step 24 of forming the overclad region occurs, i.e., the environment in which one or more of the overclad region formation steps 34, 36, 38 occurs. For example, according to embodiments of the invention, an improved oxygen stoichiometry is established for the environment in which the overclad dehydration step 36 occurs. However, it should be understood that embodiments of the invention include improving the oxygen stoichiometry of the environment in which any one or more of the overclad region formation steps 34, 36, 38 occur.

Once the one or more improved oxygen stoichiometry environments have been established, the various core rod and overclad region formation steps are performed, resulting in the formation of an optical fiber preform, or, more typically, an overclad optical fiber preform. Then, the optical fiber drawing step 22 is performed, e.g., as discussed previously herein.

Although the improved oxygen stoichiometry conditions established by step 42 reduce the likelihood of Si defects materializing in the optical fiber preforms as they are being produced, according to embodiments of the invention, it is useful for another preventive step to be taken once the optical fiber has been drawn from the optical fiber preform. According to embodiments of the invention, a step 44 of exposing the drawn optical fiber to deuterium further decreases the likelihood of Si defects in the optical fiber from reacting with hydrogen to cause hydrogen aging loss increases. As previously discussed herein, fewer available Si defects provide fewer opportunities for hydrogen molecules to chemically react therewith, thus reducing the amount of hydrogen aging loss in the optical fiber under service conditions.

In general, because the diffusion characteristics of deuterium in silica-containing glass are similar to those of hydrogen, deuterium diffuses through microscopic distances in relatively short periods of time. When the diffusing deuterium atoms encounter reactive Si defects such as Si—O.defects or Si.defects, the deuterium atoms react therewith to form SiOD or SiD, respectively, both of which have absorptive losses well outside of the 700-1600 nm wavelength region used for telecommunications. Therefore, exposing optical fibers to deuterium reduces the concentration of Si defects available for subsequent reaction with hydrogen, which, in turn, reduces the potential for and/or extent of hydrogen aging loss in the fiber under service conditions.

Optical fiber produced according to the combination of improved oxygen stoichiometry environment, e.g., during one or more optical fiber preform processing steps, and subsequent exposure of optical fiber drawn from the preform to deuterium. In this manner, optical fiber made according to embodiments of the invention have improved hydrogen aging loss characteristics. Conventional deuterium treatment typically is performed at relatively high temps during the manufacture of the fiber preform. The conventional deuterium treatment exchanges/removes OH and OD that has already been formed. Such conventional deuterium treatment reduces the initial 1385 nm loss of the fiber. However, such deuterium treatment is not contemplated for reducing hydrogen aging loss, which, as discussed hereinabove, begins once the fiber has been drawn and has been put into service. According to embodiments of the invention, deuterium treatment at room temperature of fiber that already has been drawn seeks to cause reactions with Si defects that were formed during the fiber manufacturing process. In this manner, Si defects that already existed in the drawn fiber, and which will accelerate subsequent hydrogen aging loss if not addressed, are reacted with deuterium to further reduce the amount of Si defects available for combining with hydrogen to form cause hydrogen aging loss. This further reduction of available Si defects occurs without adding excess initial loss in the 700-1600 nm wavelength region.

According to embodiments of the invention, step 42 establishes an improved flow rate of gases or other improved conditions that provide for silica material that is neither oxygen-rich nor oxygen-deficient. Also, according to embodiments of the invention, once the optical fiber preform is made and fiber is drawn therefrom (i.e., step 22), the drawn fiber is exposed to deuterium, e.g., in a 0.01 atmosphere deuterium environment at room temperature for approximately 6 days. Alternatively, according to embodiments of the invention, the drawn fiber is exposed to deuterium, e.g., in a 0.05 atmosphere deuterium environment at room temperature for approximately 1.5 days. According to embodiments of the invention, optical fiber that was exposed to deuterium, e.g., in the manner described hereinabove, and whose preform was manufactured in one or more oxygen-improved environments, exhibits transmission loss (at 1385 nm) that is less than 0.33 dB/km and hydrogen aging loss increase thereafter is less than 0.04 dB/km.

Figure 3:
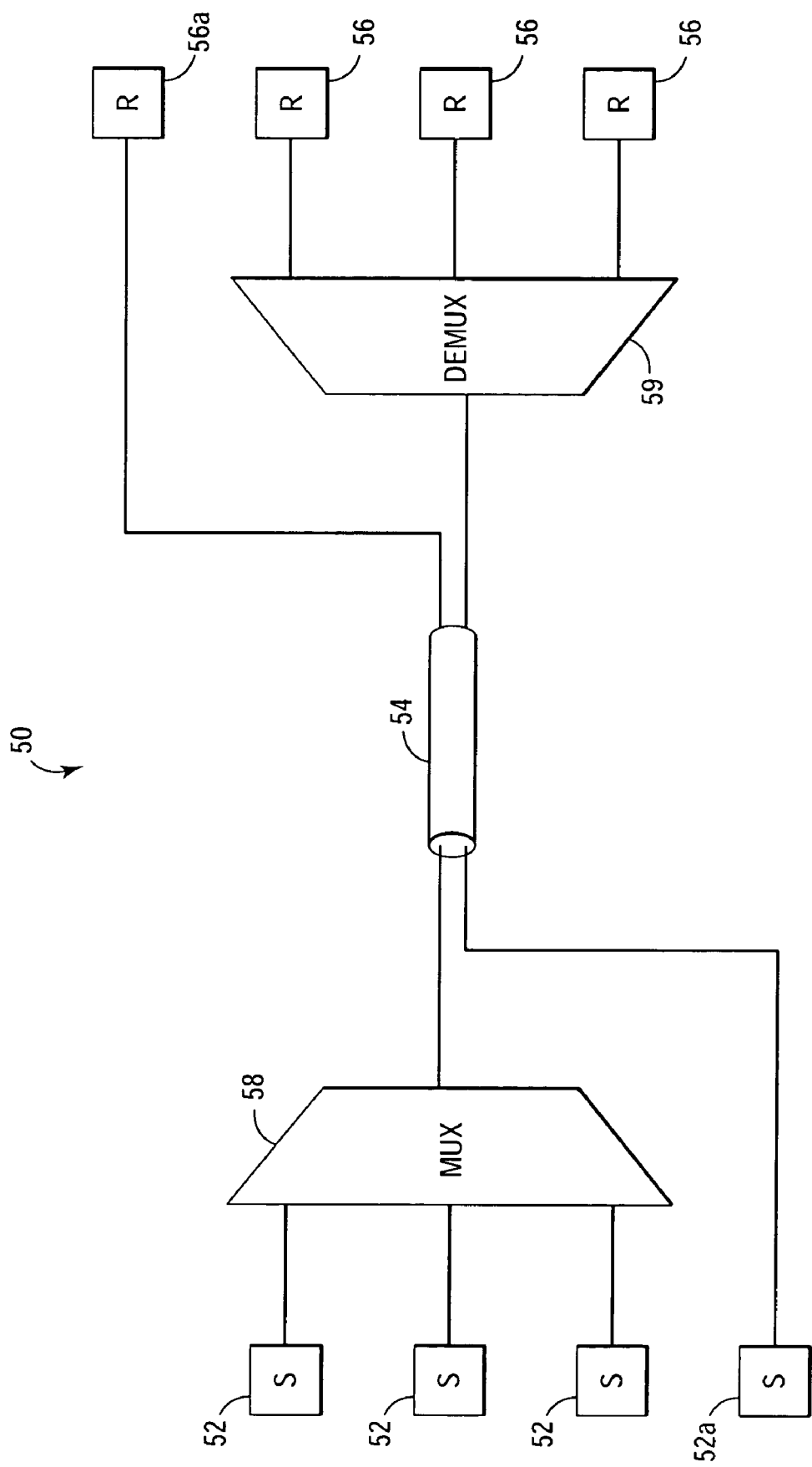
FIG. 3 is a simplified schematic diagram of an optical system in which embodiments of the invention are useful.

Referring now to FIG. 3, shown is a simplified schematic diagram of an optical system 50 in which embodiments of the invention are useful. The optical communications system 50 includes one or more optical sources 52 coupled, e.g., in a conventional manner, to one or more optical fibers 54. The optical fibers 54 are coupled to one or more optical detectors or receivers 56, e.g., in a conventional manner. The optical sources 52 and the optical receivers 56 operably connect to the optical fibers 54 directly (see, e.g., source 52$_a$ and receiver 56$_a$), or through a multiplexer 58 (on the source side of the system) or a demultiplexer 59 (on the receiver side of the system).

One or more of the optical fibers 54 are manufactured in accordance with embodiments of the invention, e.g., as discussed hereinabove. That is, at least one of the optical fibers 54 are drawn from preforms made in one or more process environments in which the oxygen stoichiometry was improved, e.g., through oxygen or CO flow rates, or other suitable conditions, to reduce defects that contribute to aging loss and other losses such as OH absorption losses, and optical fiber, once drawn from the preform, was exposed to deuterium at room temperature. The optical fibers 54 manufactured according to embodiments of the invention typically have transmission losses less than 0.33 dB/km at 1385 nm, and the hydrogen aging loss increase thereafter is less than 0.04 dB/km.

It will be apparent to those skilled in the art that many changes and substitutions can be made to the embodiments of the optical fiber and optical fiber fabrication methods herein described without departing from the spirit and scope of the invention as defined by the appended claims and their full scope of equivalents.

The invention claimed is:

1. A method for making optical fiber, the method comprising the steps of:
    forming a glass core rod by soot deposition, the glass core rod having a core region surrounded by a cladding region;
    dehydrating the glass core rod;
    consolidating the glass core rod to form an optical fiber preform;
    drawing fiber from the optical fiber perform, wherein the drawn optical fiber has a transmission loss at 1385 nm that is less than 0.33 db/km; and
    exposing the drawn optical fiber to an atmosphere containing deuterium at room temperature, wherein the partial pressure of deuterium is between approximately 0.01 and 0.05 atmospheres, and wherein the drawn optical fiber is exposed to the atmosphere containing deuterium for a time period that is sufficient to limit any future hydrogen-aging increase in transmission loss at 1385 nm to less than 0.04 db/km.

2. The method as recited in claim 1, wherein the partial pressure of deuterium is approximately 0.01 atmospheres and the time period is approximately 6 days.

3. The method as recited in claim 1, wherein the exposing step further comprises exposing the drawn optical fiber to a deuterium atmosphere in such a way that reduces the amount of Si defects in the fiber.

4. The method as recited in claim 1, further comprising the step of forming an overclad region around the glass core rod to form an overclad optical fiber preform, and wherein the drawing step comprises drawing fiber from the overclad optical fiber preform.

5. The method as recited in claim 4, wherein the overclad region forming step comprises the steps of:
    depositing soot around the glass core rod;
    dehydrating the deposited soot; and
    consolidating the deposited soot around the glass core rod.

6. The method as recited in claim 5, wherein the soot deposition in the overclad region forming step is selected from the group consisting of vapor axial deposition (VAD) and outside vapor deposition (OVD).

7. The method as recited in claim 4, wherein the overclad region forming step comprises the steps of:
    positioning an overclad tube around the glass core rod; and
    heating the overclad tube along the length thereof in such a way that the overclad tube collapses onto the glass core rod to form the overclad optical fiber preform.

8. The method as recited in claim 1, wherein the soot deposition in the glass core rod forming step is selected from the group consisting of vapor axial deposition (VAD) and outside vapor deposition (OVD).

9. The method as recited in claim 1, wherein the partial pressure of deuterium is approximately 0.05 atmospheres and the time period is approximately 1.5 days.

* * * * *